US009813399B2

(12) United States Patent
Velusamy

(10) Patent No.: US 9,813,399 B2
(45) Date of Patent: *Nov. 7, 2017

(54) SECURE REMOTE USER DEVICE UNLOCK FOR CARRIER LOCKED USER DEVICES

(71) Applicant: T-Mobile USA, Inc., Bellevue, WA (US)

(72) Inventor: Senthil Kumar Mulluppadi Velusamy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/856,742

(22) Filed: Sep. 17, 2015

(65) Prior Publication Data

US 2017/0085546 A1 Mar. 23, 2017

(51) Int. Cl.
  *G06F 7/04* (2006.01)
  *H04L 29/06* (2006.01)
  *H04W 8/22* (2009.01)
  *H04L 29/08* (2006.01)
  (Continued)

(52) U.S. Cl.
  CPC .............. *H04L 63/08* (2013.01); *H04L 67/02* (2013.01); *H04L 67/10* (2013.01); *H04W 8/22* (2013.01); *H04W 12/04* (2013.01); *H04W 12/08* (2013.01)

(58) Field of Classification Search
  None
  See application file for complete search history.

(56) References Cited

U.S. PATENT DOCUMENTS 6,327,660 B1 12/2001 Patel
7,783,281 B1 8/2010 Cook et al.
8,321,916 B2 11/2012 Aissi et al.
(Continued)

FOREIGN PATENT DOCUMENTS

CN 1331371 C 8/2007
CN 101398872 A 4/2009
(Continued)

OTHER PUBLICATIONS

"Chinese Office Action" for Chinese Patent Application No. 201280053062.8, dated Feb. 26, 2016, 10 pages.
"European Search Report" for EP Patent Application No. 12843678.9, dated May 20, 2015, 8 pages.
"European Search Report" for EP Patent Application No. 13778691.9, dated Nov. 27, 2015, 9 pages.
(Continued)

Primary Examiner — Brandon Hoffman
(74) Attorney, Agent, or Firm — Han Santos, PLLC; Elliott Y. Chen

(57) ABSTRACT

System and method of unlocking a user device. A carrier unlock request is received for a user device that may have an unlock application that has been deactivated or flashed. One or more verifications are performed to determine whether the user device is eligible for the carrier unlock requested. Upon determining that the user device is eligible for the carrier unlock, an unlock command is sent to either the user device or an alternate computing device that initiated the unlock request. The unlock command is operative to disable a comparison of a device carrier code of the user device to a subscriber identity module (SIM) carrier code stored in a SIM card of the user device. In various embodiments, the unlock command may be sent either directly to the modem of the user device via USSD or as a QR code to the alternate computing device.

21 Claims, 8 Drawing Sheets

(51) Int. Cl.
*H04W 12/04* (2009.01)
*H04W 12/08* (2009.01)

(56) References Cited

U.S. PATENT DOCUMENTS

| | | | |
|---|---|---|---|
| 8,463,239 B1* | 6/2013 | Koller | H04M 1/72519 455/410 |
| 8,666,366 B2* | 3/2014 | DeAtley | H04L 63/08 455/410 |
| 9,055,443 B2 | 6/2015 | Froelich et al. | |
| 9,172,538 B2 | 10/2015 | Obaidi | |
| 9,319,884 B2 | 4/2016 | Buzescu et al. | |
| 9,426,661 B2 | 8/2016 | Obaidi | |
| 9,591,484 B2 | 3/2017 | Ionescu et al. | |
| 2006/0075259 A1 | 4/2006 | Bajikar et al. | |
| 2007/0154014 A1 | 7/2007 | Aissi et al. | |
| 2007/0264990 A1 | 11/2007 | Droste et al. | |
| 2008/0090614 A1 | 4/2008 | Sicher et al. | |
| 2008/0132226 A1 | 6/2008 | Carnall | |
| 2008/0209206 A1 | 8/2008 | Vaha-Sipila et al. | |
| 2008/0212781 A1 | 9/2008 | Vennelakanti et al. | |
| 2008/0307494 A1 | 12/2008 | Holtzman et al. | |
| 2009/0165119 A1 | 6/2009 | Ramanath | |
| 2009/0270126 A1 | 10/2009 | Liu | |
| 2009/0325646 A1 | 12/2009 | Stewart et al. | |
| 2010/0082968 A1 | 4/2010 | Beverly | |
| 2010/0263043 A1 | 10/2010 | Xu | |
| 2010/0273452 A1 | 10/2010 | Rajann et al. | |
| 2010/0299744 A1 | 11/2010 | Mardiks | |
| 2011/0130118 A1 | 6/2011 | Fan et al. | |
| 2011/0154030 A1 | 6/2011 | Hazra et al. | |
| 2011/0159843 A1 | 6/2011 | Heath et al. | |
| 2011/0212706 A1 | 9/2011 | Uusilehto | |
| 2012/0042376 A1 | 2/2012 | Dolgunov et al. | |
| 2012/0042396 A1 | 2/2012 | Guerra et al. | |
| 2012/0083242 A1 | 4/2012 | Spitz et al. | |
| 2012/0101941 A1 | 4/2012 | Kang et al. | |
| 2013/0122864 A1* | 5/2013 | Haggerty | H04L 63/105 455/411 |
| 2014/0038556 A1 | 2/2014 | Sousa | |
| 2015/0106456 A1 | 4/2015 | Hoek | |
| 2016/0029220 A1 | 1/2016 | Obaidi | |
| 2016/0154982 A1 | 6/2016 | Velusamy et al. | |

FOREIGN PATENT DOCUMENTS

| | | |
|---|---|---|
| CN | 104081403 B | 10/2014 |
| CN | 104335619 A | 2/2015 |
| EP | 2063378 A2 | 5/2009 |
| EP | 2839687 A1 | 2/2015 |
| EP | 2839690 A1 | 2/2015 |
| EP | 2771833 | 6/2015 |
| WO | 2013063353 A1 | 5/2013 |
| WO | 2013158977 A1 | 10/2013 |
| WO | 2013158999 A1 | 10/2013 |
| WO | 2013158971 A1 | 10/2015 |
| WO | 2016053498 A1 | 4/2016 |

OTHER PUBLICATIONS

"European Search Report" for EP Patent Application No. 13778922.8, dated Nov. 11, 2015, 6 pages.
"Notice of Allowance" for U.S. Appl. No. 13/660,350, dated Nov. 2014, 12 pages.
"Office Action" for U.S. Appl. No. 13/796,550, dated Jan. 26, 2015, 29 pages.
"Final Office Action" for U.S. Appl. No. 13/796,550, dated May 13, 2015, 22 pages.
"Office Action" for U.S. Appl. No. 13/796,550, dated Jan. 11, 2016, 33 pages.
"Final Office Action" for U.S. Appl. No. 13/796,550, dated May 23, 2016, 27 pages.
"Office Action" for U.S. Appl. No. 13/796,550, dated Nov. 10, 2016, 27 pages.
"Final Office Action" for U.S. Appl. No. 13/796,550, dated Mar. 29, 2017, 25 pages.
"Office Action" for U.S. Appl. No. 13/839,189, dated Feb. 24, 2015, 37 pages.
"Final Office Action" for U.S. Appl. No. 13/839,189, dated Aug. 21, 2015, 16 pages.
"Office Action" for U.S. Appl. No. 13/839,189, dated Dec. 23, 2015, 19 pages.
"Final Office Action" for U.S. Appl. No. 13/839,189, dated Jul. 11, 2016, 19 pages.
"Notice of Allowance" for U.S. Appl. No. 13/839,189, dated Oct. 24, 2016, 16 pages.
"Notice of Allowance" for U.S. Appl. No. 13/840,045, dated Feb. 18, 2015, 8 pages.
"Office Action" for U.S. Appl. No. 13/840,045, dated Jul. 29, 2015, 15 pages.
"Notice of Allowance" for U.S. Appl. No. 13/840,045; dated Dec. 10, 2015, 11 pages.
"Notice of Allowance" for U.S. Appl. No. 13/840,045, dated Feb. 1, 2016, 10 pages.
"Notice of Allowance" for U.S. Appl. No. 13/840,045, dated Mar. 2016, 6 pages.
"Office Action" for U.S. Appl. No. 13/842,116, dated Jan. 27, 2015, 28 pages.
"Notice of Allowance" for U.S. Appl. No. 13/842,116, dated Jun. 12, 2015, 12 pages.
"Notice of Allowance" for U.S. Appl. No. 13/842,116, dated Sep. 30, 2015, 8 pages.
"Office Action" for U.S. Appl. No. 14/795,850, dated Sep. 9, 2016, 19 pages.
"Final Office Action" for U.S. Appl. No. 14/795,850, dated Mar. 9, 2017, 19 pages.
"Office Action" for U.S. Appl. No. 14/874,023, dated Dec. 21, 2015, 16 pages.
"Notice of Allowance" for U.S. Appl. No. 14/874,023, dated Apr. 7, 2016, 11 pages.
"Chinese Office Action" for Chinese Patent Application No. 201380020694.9, dated Jun. 2, 2017, 18 pages.
"Chinese Office Action" for Chinese Patent Application No. 201280053062.8, dated Feb. 26, 2016, 23 pages.

* cited by examiner

SECURE REMOTE USER DEVICE UNLOCK FOR CARRIER LOCKED USER DEVICES

BACKGROUND

Mobile communication devices, such as smartphones, are often carrier-locked, to restrict the devices to a particular wireless communication carrier and a specific region. A user device may be carrier locked to a wireless communication carrier via a subscriber identity module (SIM) lock engine that is located within the modem of the user device.

One of the reasons a network provider carrier locks a communication device to a particular carrier is because these devices may be offered at a discount to customers in exchange for a contract to pay for the use of the network for a predetermined time period. This subsidized device business model allows the service provider to recoup the cost of the communication device during the term of the contract. An unlocked subsidized device could be used on an alternate network for a lower fee thereby disrupting the business model.

However, wireless communication carriers may carrier unlock mobile communication devices for eligible customers upon request. For example, a wireless communication carrier may unlock a mobile communication device after a customer has completed the termed service contract. In order to distinguish between carrier unlock requests of eligible customers and non-eligible customers, wireless communication carriers may use customer service representatives as gatekeepers. Upon receiving a carrier unlock request from a customer for a mobile communication device, a customer service representative may initiate a review to ascertain whether the customer is eligible to have the mobile communication device unlocked. Following successful verification, the customer service representative may subsequently provide an unlock code to the customer for unlocking the mobile communication device. The customer then enters the unlock code into the mobile communication device at the appropriate user input interface to unlock the device. In some instances, the verification of eligibility by a customer service representative for a carrier unlock may take several days.

The duration of such unlock eligibility verification may result in poor customer experience. Further, such unlock eligibility verification may be overly burdensome when the customer is requesting a partial unlock of a mobile communication device, such as unlocking the wireless communication device for use with a foreign mobile carrier while traveling aboard. Additionally, since mobile communication devices of a particular manufacturer and model may share a common unlock code, a malicious user may use an unlock code to unlock other mobile communication devices that are otherwise ineligible to be unlocked.

Even if a mobile device may include a local unlock application that was previously installed on the mobile device (e.g., as part of the firm-ware, system software, and/or application, referred collectively herein as the "SIM unlock app") to facilitate an automated and secure unlock procedure, it may be deactivated or lost accidentally or through malicious intervention. For example, a user of the mobile device may choose to flash the firmware of the mobile device in order to change the character of the phone. In this scenario, a user may not want to be bound to a provider's package or infrastructure provided via the firmware and system software pre-installed on the mobile device. Flashing the mobile device may remove the SIM unlock app, thereby disabling the automatic unlock capability features of the mobile device.

In another scenario, a user may download an application (e.g., utility software) that may promise to manage, maintain, and/or better control the mobile device resources. In this regard, this application may turn off or even purge what it may regard as "background processes" that are not deemed necessary. Accordingly, in its "optimization" sweep, this application may flash or deactivate the SIM unlock app, thereby removing the automatic unlock capability of the mobile device. It is with respect to these considerations and others that the present disclosure has been written.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
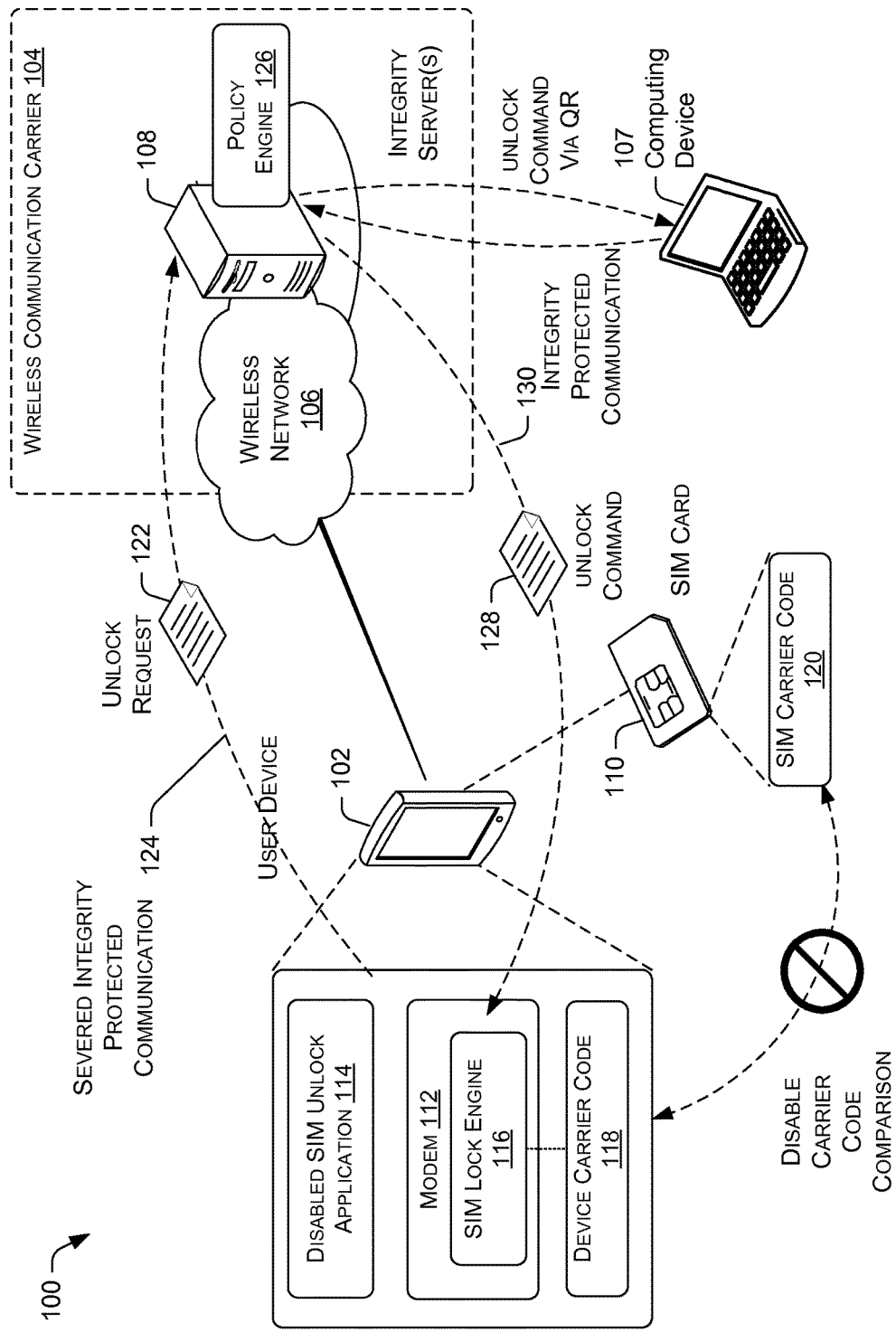
FIG. 1 illustrates an example network architecture for implementing remote unlocking of user devices.

This disclosure generally relates to methods and systems of remote unlocking a user device that is flashed or at least disabled in part. The remote unlock function may unlock a user device from exclusive use on a network of a wireless communication carrier even if its application to facilitate an unlock operation has been flashed or deactivated. A user device may be carrier locked to a wireless communication carrier via a subscriber identity module (SIM) lock engine that is located within the modem of the user device.

A carrier code may be permanently embedded in the user device at the time that the user device is manufactured. When a user subsequently signs for service with a wireless communication carrier, a SIM card that provides access to the network of the mobile communication carrier may be installed on the user device. At each boot time of the user device for use, the SIM lock engine of the user device may perform a carrier verification check. The carrier verification check may compare the embedded carrier code against a carrier code that is stored in a SIM card. Thus, if the SIM lock engine determines that the embedded carrier code matches the carrier code stored in the SIM, the SIM lock engine may permit the user device to initiate a normal boot up. Otherwise, the user device is permitted by the SIM lock engine to boot into a limited functionality mode.

In various embodiments, the remote unlock function may unlock a user device from a network of a wireless communication carrier in response to an unlock request for a user device that has its SIM unlock engine flashed or deactivated. Thus, the unlock request cannot be initiated by a user via an unlock application that was originally installed on the user device. In one embodiment, the unlock request is initiated on the user device manually via a secure connection with an authentication server, which, upon authentication contacts an integrity server having a policy engine of the wireless communication carrier. The secure connection between the user device 102 and the integrity server 104 is discussed in more detail later.

The policy engine may perform an unlock eligibility verification. Upon verifying that the user device is eligible for the carrier unlock, the policy engine may transmit an unlock command directly to the SIM lock engine of the modem the user device. The unlock command may disable the SIM lock engine from performing the carrier verification check at each boot time of the user device. In some embodiments, the transmission of the unlock request and the unlock command for a user device may be performed using integrity protected communication.

In various embodiments the methods and systems discussed herein provide an automated carrier unlock that can bypass a customer care representative associated with the assigned network of the user device, despite the automatic unlock capability via the SIM unlock app of the user device being deactivated or flashed. Consequently, the customer relations with the user of the user device are improved because the time consuming interaction with a customer care representative is not necessary. Instead of waiting for as long as multiple days for a customer service representative to fulfill a carrier unlock request, a user device may be unlocked in a shorter amount of time, e.g., in as short as a few seconds.

Further, the techniques do not rely on the use of a generic unlock code that is shared by an entire line of user devices. As a result, misappropriation of such an unlocked code by a malicious third party to perform unauthorized unlocking of other user devices may be reduced or eliminated. Additionally, the use of integrity protected communication to transmit the unlock requests and receive the unlock code from the integrity server, substantially excludes the spoofing of such requests and responses by malicious third parties. The techniques described herein may be implemented in a number of ways. Example implementations are provided below with reference to the following figures.

Example Network Architecture

FIG. 1 illustrates an example architecture 100 for implementing secure remote unlocking of user devices. The architecture 100 may include a user device 102 and a wireless communication carrier 104. The wireless communication carrier 104 may operate a wireless network 106. The wireless network 106 may include base stations and a core network. The base stations may be a part of the access network structure of the wireless network 106. The base stations are responsible for handling voice and data traffic between user devices, such as the user device 102 and the core network. Alternatively, the user device 102 may access the core network via other communication networks of the wireless communication carrier 104 and/or third-party providers that connect to the core network. The core network may provide telecommunication and data communication services to the user devices. For example, the core network may connect the user device 102 to other telecommunication and data communication networks. In various embodiments, the core network may include one or more integrity server(s) 108.

The user device 102 may be a smartphone, a tablet computer, or any other device that is capable of using a SIM card 110 to obtain telecommunication and/or data communication services from the wireless network 106. The user device 102 may include a modem 112 and a SIM unlock app 114 that has been deactivated or flashed.

The modem 112 is a hardware component that enables the user device 102 to perform telecommunication and data communication with the wireless network 106. The modem 112 may include a software SIM lock engine 116. The SIM lock engine 116 is able to access a device carrier code 118 that is embedded in the user device 102 when the device was manufactured. Furthermore, the SIM lock engine 116 is also able to access a SIM carrier code 120 that is stored in the SIM card 110.

During each boot of the user device 102, the SIM lock engine 116 may perform a verification of the device carrier code 118 against the SIM carrier code 120. Accordingly, if the SIM lock engine 116 determines that the device carrier code 118 matches the SIM carrier code 120, the SIM lock engine 116 may permit the user device 102 to initiate a normal boot up. Otherwise, the user device is permitted by the SIM lock engine 116 to boot into a limited functionality mode. In one example, the limited functionality mode may at best allow the user device 102 to place emergency service calls using the network of the wireless communication carrier. In another example, the limited functionality mode may allow the user device 102 to use a network in one region but not another (e.g., prevent the use in an abroad network).

While the user device may have a SIM unlock app 114 (e.g., previously) stored in its memory, this application may be flashed or disabled. Accordingly, an initiation of an unlock of the user device 102 via the SIM unlock app is impractical. In one embodiment, the user device 102 can be used to establish a connection with an identity server via various communication techniques that do not rely on the disabled (e.g., missing) SIM unlock application 114). In various embodiments, common short code (CSC) using a short message service (SMS) or multimedia message service (MMS) can be used to address the integrity server 108.

In one embodiment, unstructured supplementary service data (USSD) technology is used to establish an integrity protected communication 124 with the integrity server 108. For example, the phone dialer feature of the user device may be used to establish the connection with the integrity server 108. It should be noted that messages sent over USSD are not defined by any standardization body. Accordingly, a network operator can implement the appropriate interface with the desired level of security for such USSD communication. For example, code "*88*081516*083016#" may request an unlock for France from Aug. 15, 2016 to Aug. 30, 2016.

In the following discussion, USSD communication is used between the user device and the integrity server, by way of example only, not by limitation. It will be understood that other suitable communication technologies can be used as well, based on the concepts discussed herein.

A user of the user device 102 may use USSD to initiate a carrier unlock request 122 for the user device 102. In this regard, integrity protected communication 124 may be used to transmit the unlock request 122 to the integrity server(s) 108. As used herein, integrity protected information means information that is assured in accuracy and completeness.

The unlock request 122 may be received by a policy engine 126 that resides on one or more integrity server(s) 108. The policy engine 126 may perform an unlock eligibility verification based on information related to the user and the user device 102. Upon verifying that the user device 102 is eligible for the carrier unlock, the policy engine 126 may transmit an unlock command 128 to the user device 102. In one embodiment, the communication to the user device is via integrity protected communication 130. The integrity protected communication 124 and 130 may be implemented using keys that are assigned to a user device 102 prior to the distribution of the user device for use by a consumer.

The unlock command 128 may instruct the modem 112 to disable the SIM lock engine 116 from performing the carrier verification check at each boot time of the user device. As a result, the user device 102 will subsequently boot up and use an available network of a compatible wireless communication carrier regardless of the carrier code of the compatible wireless communication carrier. In various embodiments, the integrity protected communication 124 to the integrity server 108 and the integrity protected communication 130 from the integrity server 108 may be exchanged between the user device 102 and the policy engine 126 via the wireless network 106, a mobile hotspot operated by the wireless telecommunication carrier 104, a third-party data communication network, or any combination thereof.

In some embodiments, depending on the particular USSD message from the user device 102, the user may designate whether the unlock request is for a permanent carrier unlock or a temporary carrier unlock, i.e., unlock the user device for a time duration. In some embodiments, there may be multiple levels of temporary carrier unlock, wherein each level corresponds to a different time duration. Alternatively or concurrently, the user may use one or more predetermined USSD messages to select one or more geographical regions for which carrier unlock is desired, such that the user device can be used with networks of wireless communication carriers that serve such regions.

Thus, the customization of the unlock request 122 may result in multiple scenarios of unlock requests, in which each scenario of the unlock requests has a unique combination of factors, such as unlock permanency, unlock time duration, unlock geographical region, and/or so forth, that is provided to the integrity server without assistance from the SIM unlock app. In one embodiment, the user may also use the interface menu to request a cancellation of a carrier unlock for the user device 102, regardless of whether the carrier unlock is temporary or permanent, such that the user device 102 may revert back to a carrier locked state.

The policy engine 126 may use the scenario of the unlock request 122 to determine an amount or types of checks to be performed during the unlock eligibility verification, as each scenario of unlock requests may have a corresponding set of verifications that are to be performed. For example, a request for a temporary carrier unlock for 60 days may result in verification that the user of the user device has no outstanding service bills. In another example, a request for a temporary carrier unlock for 30 days may result in verification that the user is no more than one month behind in paying service bills. In contrast, a request for a permanent carrier unlock may result in verification that the user device is fully paid for and that the user of the user device has no outstanding service bills. Accordingly, a permanent carrier unlock request may result in more verifications than a temporary carrier unlock request.

In one embodiment, the user device 102 that is subject of the unlock request, is not the source of the unlock request. Rather, the request may originate from an alternate computing device 107, which may take the form of a portable handset, smart-phone, tablet, personal digital assistant (PDA), smart watch, personal computer, etc. Using an alternate computing device is particularly useful if the user device 102 is not capable of establishing communication with the integrity server 108 for various reasons. The computing device 107 may be used to contact the integrity server via various communication technologies, such as CSC, SMS, MMS, USSD, as well as a public packet switched network, such as the network commonly referred to as the "Internet."

For example, the computing device may contact the integrity server 108 over the internet via a web page of the integrity server 108. Authentication is provided by the user providing account information via a user interface (e.g., display) of the computing device 107. Once on the web page of the integrity server, the user may instruct the integrity server to provide information to unlock the user device 102. To that end, the integrity server, instead of sending the unlock code to the user device 102, may send the unlock command in the form of a QR code to the alternate computing device 107. In various embodiments, the integrity protected communication may be received by the computing device 107 via a secure download via the internet, via various known text message technologies, an e-mail address associated with an account of the user device 102 stored at a memory of the integrity server, or USSD response message.

In one embodiment, the received QR code can be displayed on the user interface (e.g., display) of the computing device. In another embodiment, the computing device may instruct a printer to print out the QR code. The QR code can subsequently be scanned by the user device 102 to unlock the same, based on the request from the computing device 107.

Example User Device Components

Figure 2:
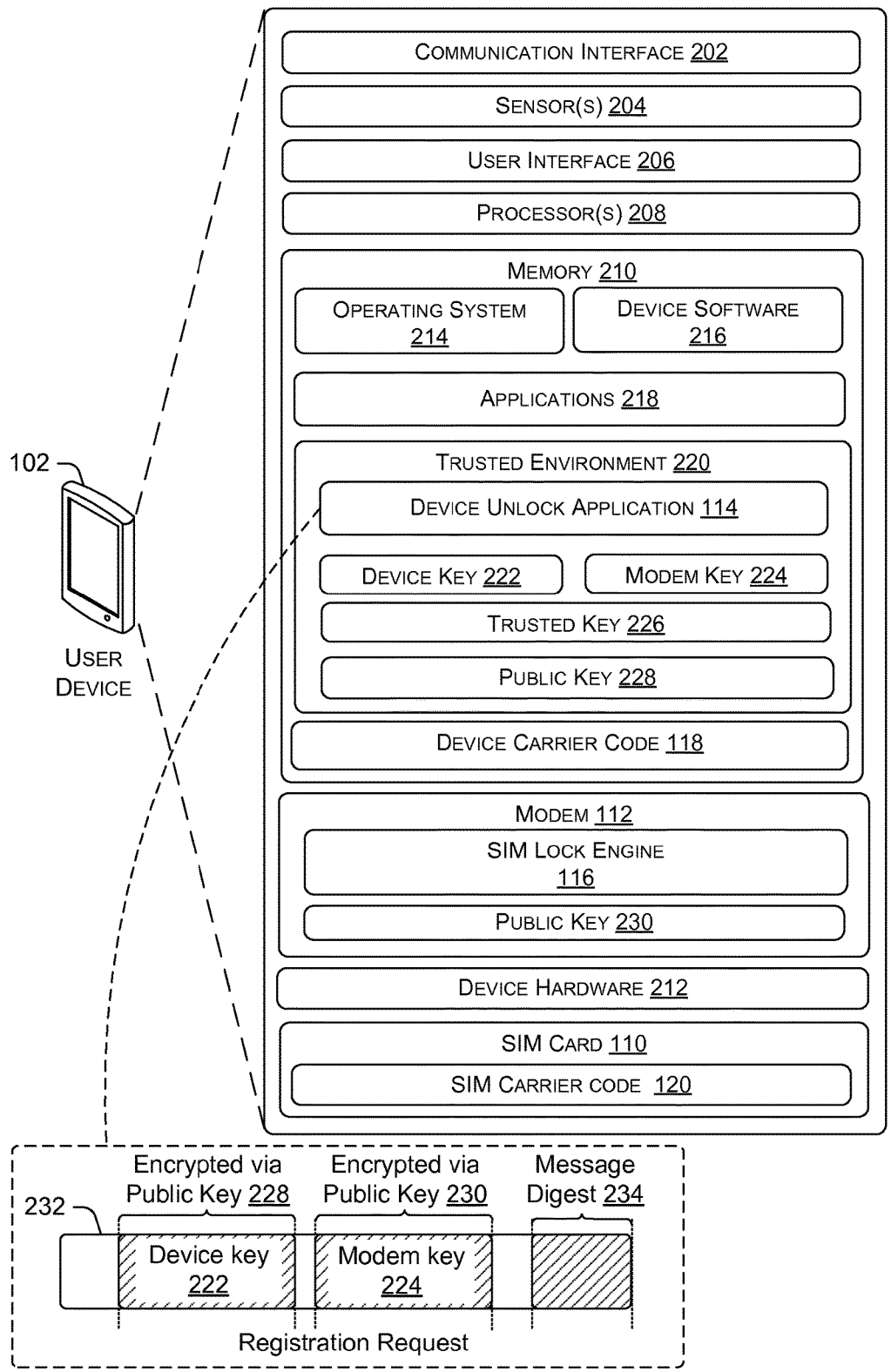
FIG. 2 is a block diagram showing various components of an illustrative user device that supports secure remote unlocking.

FIG. 2 is a block diagram showing various components of an illustrative user device 102 that supports secure remote unlocking. In one embodiment, the computing device 107 may have similar components. The user device 102 may include a communication interface 202, one or more sensors 204, a user interface 206, one or more processors 208, and memory 210.

The communication interface 202 may include wireless and/or wired communication components that enable the electronic device to transmit or receive voice or data communication via the wireless network 106, as well as other telecommunication and/or data communication networks. The sensors 204 may include a proximity sensor, a compass, an accelerometer, and/or a global positioning system (GPS) sensor. The proximity sensor may detect movement of objects that are proximate the user device 102. The compass, the accelerometer, and the GPS sensor may detect orientation, movement, and geolocation of the user device 102.

The user interface 206 may enable a user to provide inputs and receive outputs from the user device 102. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The user device 102 may also include the modem 112 and other device hardware 212. As described above in FIG. 1, the modem 112 is a hardware component that enables the user device 102 to perform telecommunication and data communication with the wireless network 106. The modem 112 may implement the software SIM lock engine 116.

The device hardware 212 may include other hardware that is typically located in a mobile telecommunication device. For example, the device hardware 212 may include signal converters, antennas, hardware decoders and encoders, graphic processors, a SIM card slot, and/or the like that enable the user device 102 to execute applications and provide telecommunication and data communication functions. The SIM card 110 may be inserted into the SIM card slot of the user device 102. The SIM card 110 may contain subscriber identification information and the SIM carrier code 120. Accordingly, the SIM card 110 may enable the user device 102 to obtain telecommunication and/or data communication services from the wireless communication carrier that is identified by the SIM carrier code 120.

The one or more processors 208 and the memory 210 of the user device 102 may implement an operating system 214, device software 216, and one or more applications 218. This software may include routines, program instructions, objects, and/or data structures that perform particular tasks or implement particular abstract data types.

The operating system 214 may include components that enable the user device 102 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with the modem 112 and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device to perform functions. For example, the device software 216 may include basic input/output system (BIOS), bootrom, or a bootloader that boots up the user device 102 and executes the operating system 214 following power up of the device.

The applications 218 may include applications that provide utility, entertainment, and/or productivity functionalities to a user of the user device 102. For example, the applications 218 may include telephony applications, electronic mail applications, remote desktop applications, web browser applications, navigation applications, office productivity applications, multimedia streaming applications, and/or so forth.

The one or more processors 208 and the memory 210 of the user device 102 may further implement a trusted environment 220. The trusted environment 220 is an isolated execution space that is provided by dedicated software and/or hardware of a device. For example, the trusted environment 220 may employ a dedicated memory space or memory chip that is not accessible by applications and/or hardware components not located in the dedicated memory space or memory chip, unless such applications and/or hardware components are provided with special access privileges through secure communication channels.

Alternatively or concurrently, the applications that reside in the trusted environment 220 may be executed by a dedicated processor. The isolation of the trusted environment 220 provides a high level of security for the execution code or data stored in the execution space.

In various embodiments, the trusted environment 220 may store the SIM unlock app 114, a device key 222, a modem key 224, a trusted key 226, and a public key 228 of a public-private key pair. As discussed herein, the SIM unlock app 114 may be inadvertently or deliberately flashed or deactivated.

The device key 222 uniquely identifies the user device 102. In some embodiments, the device key 222 may be stored into the trusted environment 220 at the time the device is manufactured. Likewise, the modem key 224 may uniquely identify the modem 112 installed in the user device 102. In some embodiments, the modem key 224 may be assigned to the modem 112 at the time the modem 112 is manufactured.

The trusted key 226 is a unique key that is assigned to the trusted environment 220. The trusted key 226 is known to the manufacturer of the hardware that implements the trusted environment 220. Furthermore, the identity of the user device 102, such as the International Mobile Station Equipment Identity (IMEI) of the user device, may also be known to the manufacturer. In various embodiments, the trusted key 226 and its relationship to the trusted environment 220, as well as its association with the user device 102, is also known to a trusted third-party (e.g., a validation server) that may be called upon to validate the trusted key 226.

The trusted environment 220 may also store a public key 228, e.g., a public certificate, of a public-private key pair, in which the private key of the public-private key pair is known to the policy engine 126. For example, the public key 228 may be embedded into the dedicated memory space of the trusted environment 220 by the manufacturer of the trusted environment 220. The wireless communication carrier 104, in turn, may obtain the private key that corresponds to the public key 228 from the manufacturer for storage in the integrity server(s) 108. The memory 210 may further store the device carrier code 118. For example, the device carrier code 118 may be permanently stored in the memory 210 in a non-modifiable format at the time the user device 102 is manufactured.

The modem 112 may store a public key 230, e.g., a public certificate, of a public-private key pair, in which the private key is known to the policy engine 126. For example, the public key 230 may be embedded into the memory of the modem 112 by the manufacturer of the modem 112 at the time of manufacturing. The wireless communication carrier 104, in turn, may obtain the private key that corresponds to the public key 228 from the manufacturer of the modem for storage in the integrity server(s) 108. In various embodiments, a duplicate copy of the public key 230 may also be stored in the trusted environment 220 for access by the SIM unlock app 114.

The user of may use the phone dialer feature of the user device 102 to establish a connection with the integrity server 108 to carrier unlock the device 102. For example, user may use the phone dialer to send a message in USSD to the integrity server 108 to request an unlock of the user device 102, such that the policy engine 126 may unlock the user device 102. In one embodiment, the unlock request 122 may include the device key 222 that is encrypted using the public key 228, and the modem key 224 that is encrypted using the public key 230. In one embodiment, if the device key has been flashed or deactivated together with the SIM unlock app 114, only the modem key 224 is encrypted using the public key 230 and sent to the integrity server 108.

In various embodiments, the unlock request via the phone dialer in the USSD message may include other information, such as an identifier of the user device 102, the type of unlock, the timeframe for the unlock, the geographic parameters of the unlock, a time and date that the unlock request is created, etc. For example, the user may enter predetermined keys that designate whether the unlock request is for a permanent carrier unlock or a temporary carrier unlock (i.e., unlock the user device for a particular time duration). Alternatively or concurrently, the user may use the interface menu displaying the alphanumeric keys to designate one or more geographical regions for which carrier unlock is desired, such that the user may use the user device with networks of wireless communication carriers that serve such regions. Accordingly, the user requested carrier unlock details are included in the unlock request 122.

The unlock request 122 may be integrity protected by the trusted key 226. In various embodiments, the USSD message having the unlock request may be integrity protected by including a message digest 234 for the unlock request using the trusted key 226. The modem may further append the message digest 234 to the unlock request 122 in the USSD message. In this way, legitimacy of the unlock request 122 may be authenticated based on the trusted key 226.

Upon authentication, the policy engine 126 may decrypt the device key 222 (if available) and the modem key 224 using the known private keys that correspond to the public keys 228 and 230, such that duplicate copies of the device key 222 and the modem key 224 may be stored in the integrity server(s) 108. To the extent the device key 222 is missing from the user device 102, only the modem key 224 is stored in the integrity server(s) 108.

Upon determining that the user device 102 is eligible for a carrier unlock, the policy engine 126 may send the unlock command 128 to the modem 112 of the user device 102. In various embodiments, the unlock command 128 may include a modem data packet that is integrity protected by an appended message digest that is calculated for the modem data using the duplicate copy of the modem key 224. In one embodiment, the unlock command 128 in its entirety may be integrity protected by an appended message digest that is calculated for the unlock command 128 using the duplicate copy of the modem key 224. The user device 102 may receive the integrity protected unlock command 128 via the communication interface 202. For example, the communication interface 202 may route the integrity protected unlock command 128 to the modem 112 based on a message header of the integrity protected unlock command 128. Accordingly, once the user device 102 receives the integrity protected unlock command 128, the modem key 224 may be used by the modem 112 to validate the unlock command 128.

The modem 112 may perform the validation by computing a verification message digest of the unlock command 128 using the modem key 224. The modem 112 may then compare the verification message digest to the appended message digest received from the integrity server that is extracted from the unlock command 128. Thus, the modem may determine that the unlock command 128 is valid if the message digest from the unlock command 128 and the verification message digest match. Otherwise, the secure communication module 312 may deem the unlock command 128 to be invalid. Upon validation, modem 112 may extract the modem data packet from the unlock command 128.

The modem 112 may validate the modem data packet using the modem key 224. The modem 112 may then compare the verification message digest to the appended message digest that is extracted from the modem data packet. Thus, due to the flashed or missing SIM unlock app 114, the modem 112 determines that the modem data packet is valid if the message digest from the modem data packet and the verification message digest match. Otherwise, the modem data packet is considered to be invalid.

Upon validation, the modem 112 processes the unlock information in the modem data packet. The unlock information may indicate the permanency of the carrier unlock (i.e., temporary vs. permanent), a geographical region of the carrier unlock, a unique identifier of the modem data packet, the identity (e.g., session identifier) of the unlock command 128, the time and date that the modem data packet is generated, and/or so forth. The identification information may be used by the modem 112 to prevent unauthorized replay of an unlock command. For example, the modem may automatically discard a modem data packet having a session identifier associated with another unlock command that was previously processed by the SIM lock engine 116. In instances in which the carrier unlock is temporary, the unlock information may indicate the duration of the temporary carrier unlock, a start date and time for the temporary carrier unlock, and/or an end date and time of the temporary carrier unlock.

Accordingly, the implementation of the unlock information may cause the modem 112 to cease the execution of carrier code verification, i.e., the matching of the device carrier code 118 to the SIM carrier code 120 at boot time of the user device 102. The cessation of the carrier code verification may be implemented according to the conditions specified by the unlock information in the modem data packet. Additional details regarding the transmission of the unlock request 122 and the unlock command 128 between the user device 102 and the integrity server(s) 108 are discussed in FIGS. 4-7.

Example Integrity Server Components

Figure 3:
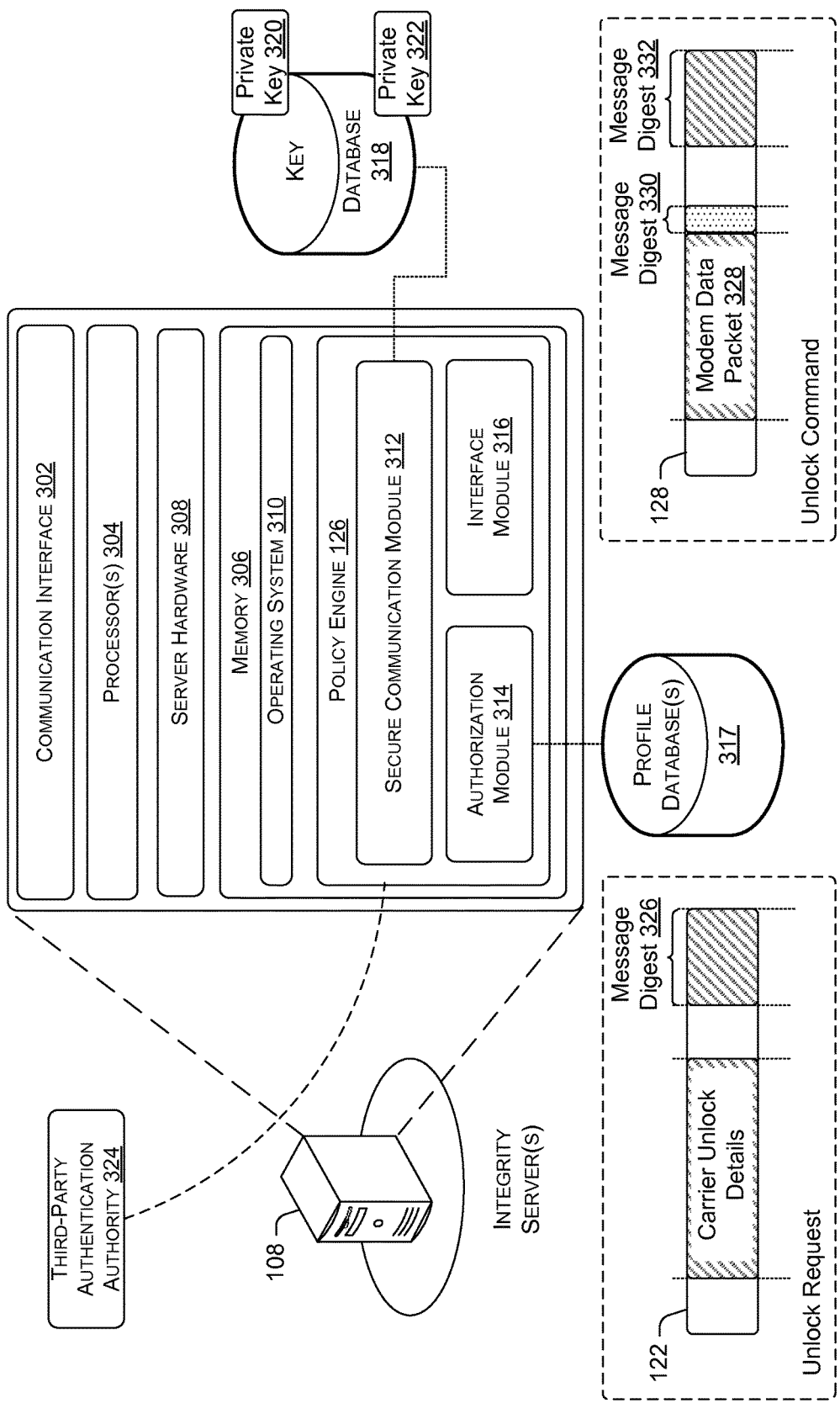
FIG. 3 is a block diagram showing various components of an illustrative integrity server that remotely unlocks a user device.

FIG. 3 is a block diagram showing various components of illustrative integrity servers that remotely unlock a user device. The integrity servers may include a communication interface 302, one or more processors 304, memory 306, and server hardware 308. The communication interface 302 may include wireless and/or wired communication components that enable the server to transmit data to and receive data from other networked devices via the wireless network 106. The server hardware 308 may include additional hardware that performs user interface, data display, data communication, data storage, and/or other server functions.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), Blu-Ray disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 304 and the memory 306 of the integrity server(s) 108 may implement an operating system 310 and the policy engine 126. The operating system 310 may include components that enable the integrity server(s) 108 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The policy engine 126 may include a secure communication module 312, an authorization module 314, and an interface module 316. The secure communication module 312 may be responsible for establishing integrity protected communication 124 and 130 with user devices, such as the user device 102 and computing device 107. For example, the secure communication module 312 may store the device key 222 (if available), the modem key 224, the private key 320, and the private key 322 in a key database 318. The private key 320 may be the counterpart of the public key 228, and the private key 322 may be the counterpart of the public key 230.

The key database 318 may also store the associated carrier lock status of each user device. Accordingly, the secure communication module 312 may use the private key 320 and the private key 322 to decrypt encrypted portions, e.g., the device key 222 (if available) and the modem key 224, of a registration request. The secure communication module 312 may also have the ability to request verification of a trusted key (e.g., trusted key 226) as belong to a particular user device (e.g., user device 102) from a trusted third-party authentication authority 324. For example, the secure communication module 312 may send a verification request to a verification server at the trusted third-party authentication authority 324. The verification request may include a device identifier of a user device (e.g., the user device 102) and a trusted key (e.g., the trusted key 226). In turn, the trusted third-party authentication authority 324 may send back an indication that the trusted key is valid if the trusted key belongs to the user device. Otherwise, the trusted third-party authentication authority 324 may indicate to the secure communication module 312 that the trusted key is invalid.

Additionally, the secure communication module 312 may perform an integrity validation of an unlock request, such as the unlock request 122 that includes the message digest 326, by independently computing a verification message digest of the unlock request 122 using the corresponding duplicate copy of the modem key 224. The secure communication module 312 may then compare the verification message digest to the message digest 326 that is extracted from the unlock request. Thus, the secure communication module 312 may determine that the unlock request 122 is valid if the message digest 326 extracted from the unlock request 128 and the verification message digest match. Otherwise, the secure communication module 312 may deem the unlock request 122 to be invalid.

The secure communication module 312 may also integrity protect an unlock command of a user device that is the intended recipient of the unlock command. Further, the secure communication module 312 may also protect a modem data packet in the unlock command with the modem key of the user device. For example, the unlock command 128 that is generated by the secure communication module 312 may include a modem data packet 328. The modem data packet 328 may be integrity protected by a message digest 330 that is appended to the modem data packet 328. The message digest 330 may be generated from the modem data packet 328 using a duplicate copy of the modem key 224. Further, the entirety of the unlock command 128 may be integrity protected by a message digest 332 that is appended to the unlock command 128. The message digest 332 may be generated from the unlock command 128 using a duplicate copy of the modem key 224. Accordingly, as further described in FIGS. 4, 5, and 7, the secure communication module 312 may use one or more keys in the key database 318 to securely communicate with the user device 102.

The authorization module 314 may validate carrier unlock requests that are received by the policy engine 126, such as the policy engine 126. In various embodiments, the authorization module 314 may initially classify a carrier unlock request into a carrier unlock scenario. The authorization may then check one or more profile databases 317 to determine whether to issue an unlock command to a user device 102. The profile databases 317 may include a subscriber account database that holds payment information, a user equipment status database, a subscriber information database, etc.

The number and types of profiles databases 317 that are checked may depend on the scenario of the unlock request 122. For example, a request for a temporary carrier unlock may result in verification that the user of the user device has no outstanding service bills. In contrast, a request for a permanent carrier unlock may result in verification that the user device is fully paid for and that the user of the user device has no outstanding service bills. Accordingly, the authorization module 314 may issue an unlock command in response to an unlock request when the authorization module 314 determines that an associated user device and/or subscriber is eligible for the carrier unlock. The authorization module 314 may use the communication interface 302 to send unlock commands to the user devices, such as the user device 102.

The interface module 316 may enable a user to access the authorization module 314. In some embodiments, the interface module 316 may generate one or more web pages for accessing functionalities of the authorization module 314. For example, the web pages may be used to override or cancel the distribution of unlock commands, monitor the verifications performed by the authorization module 314, gather statistical data and metrics regarding the unlock requests and unlock commands, update information in the databases, and so forth.

While the policy engine 126 is illustrated as being implemented on the integrity server(s) 108, the policy engine 126 may be implemented on any other servers of the wireless communication carrier 104, in other embodiments. For example, the policy engine 126 may be implemented on servers that perform core network and/or backhaul functions for the wireless network 106. Further, while the secure communication module 312 is illustrated as an independent component, the module may also be implemented as a part of the policy engine 126 in some embodiments.

As discussed above, in one embodiment, the unlock request for a user device 102 may originate from an alternate computing device 107. In this regard, authentication is provided by the integrity server 108 via the authorization module 314 by comparing account information stored in the memory 306 of the integrity server 108 or the profile database 317 with the information provided via the alternate computing device 107. In one embodiment, the level of security may be adjusted based on the source of the unlock request. For example, upon the integrity server 108 determining that the unlock request originates from an alternate computing device 107 for the benefit of the user device 102, the security requirements may be loosened.

The unlock command may be provided to the computing device 107 as a QR code that can be scanned by the user device 102 via a scan of a display of the computing device 107 or a printout initiated by the computing device 107.

Example Processes

FIGS. 4-8 present illustrative processes 400-800 for remotely unlocking user devices. Each of the processes 400-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-700 are described with reference to the architecture 100 of FIG. 1.

Figure 4:
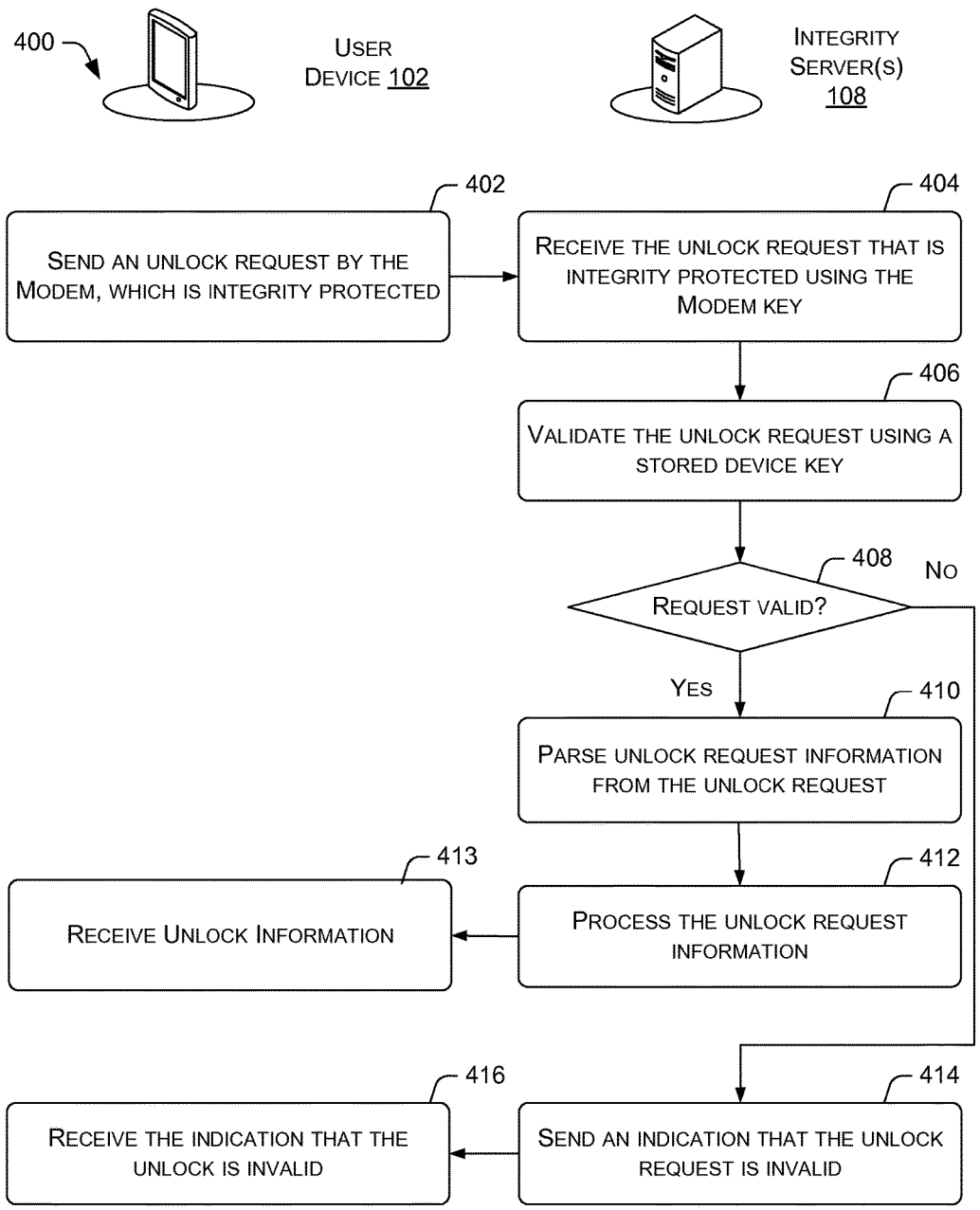
FIG. 4 is a flow diagram of an example process for unlocking a user device by an integrity server, wherein the request to unlock the user device originates from the user device.

FIG. 4 is a flow diagram of an example process 400 for sending an unlock request from a flashed user device 102 to a policy engine of the integrity server 107. In particular, the user device 102 has at least its SIM unlock app flashed or deactivated and can therefore not perform an unlock operation via the SIM unlock app. The process 400 may be performed by various components of the user device 102 and the integrity server(s) 108. In various embodiments, data that is transmitted between the user device 102 and the integrity server(s) 108 may be routed through the wireless network 106, with or without partial routing through a third-party network.

At block 402, the modem of the user device 102 sends an unlock request 122 to the policy engine 126 via USSD. In one embodiment, the unlock request is integrity protected. In the example of FIG. 4, the request is sent via a USSD protocol. In this regard, the phone dialer feature on a user interface of the user device 102 is used to enter a predetermined code that has embedded therein the specific unlock request.

In various embodiments, the unlock request 122 may be integrity protected using the modem key 224. The integrity protection may involve the calculation of the message digest 326 for the unlock command 122 using the modem key 224. At block 404, the policy engine 126 may receive the integrity protected unlock request 122 directly from the modem of the user device 102 via USSD.

At block 406, the policy engine 126 may validate the integrity protected unlock request 122, using a stored modem key. The stored modem key may be a duplicate copy of the modem key 224 that is stored at the policy engine 126 during a prior registration of the user device 102 for carrier unlock. The policy engine 126 may perform the validation by calculating a verification message digest using the copy of the modem key 224, and then comparing the verification message digest to the message digest 326. Accordingly, matching message digests may indicate that the unlock request 122 is valid, while non-matching message digests may indicate that the unlock request 122 is invalid.

At decision block 408, if the policy engine 126 determines that the unlock request 122 is valid ("yes" at decision block 408), the process 400 may proceed to block 410. At block 410, the policy engine 126 may parse unlock request information from the unlock request 122. In various embodiments, the unlock request information may include whether the unlock is to be permanent or temporary, the timeframe of the unlock, one or more geographic locations for the unlock, the unlock request identification information, device identification information, and the like.

At block 412, the unlock request is processed and an unlock command is prepared that is specific to the user device 102. Put differently, the unlock information is not portable to other user devices, thereby substantially reducing the chance that a malicious party would use the information provided to unlock a user device in an unauthorized way.

At block 413, the unlock command is received directly by the modem 112 of the user device 102. Consequently, the user device 102 is unlocked based on the parameters provided by the integrity server 108 to the modem 112 of the user device 102.

Returning to decision block 408, if the policy engine 126 determines that the unlock request 122 is invalid ("no" at decision block 408), the process 400 may proceed to block 414. At block 414, the policy engine 126 may send an indication that the unlock request 122 is invalid via USSD. At block 416, the modem 112 on the user device 102 may receive the indication that the unlock request 122 is invalid via a USSD response. In some embodiments, the USSD response from the integrity server 108 may instruct the user device to display the indication via the user interface 206 of the user device 102.

Figure 5:
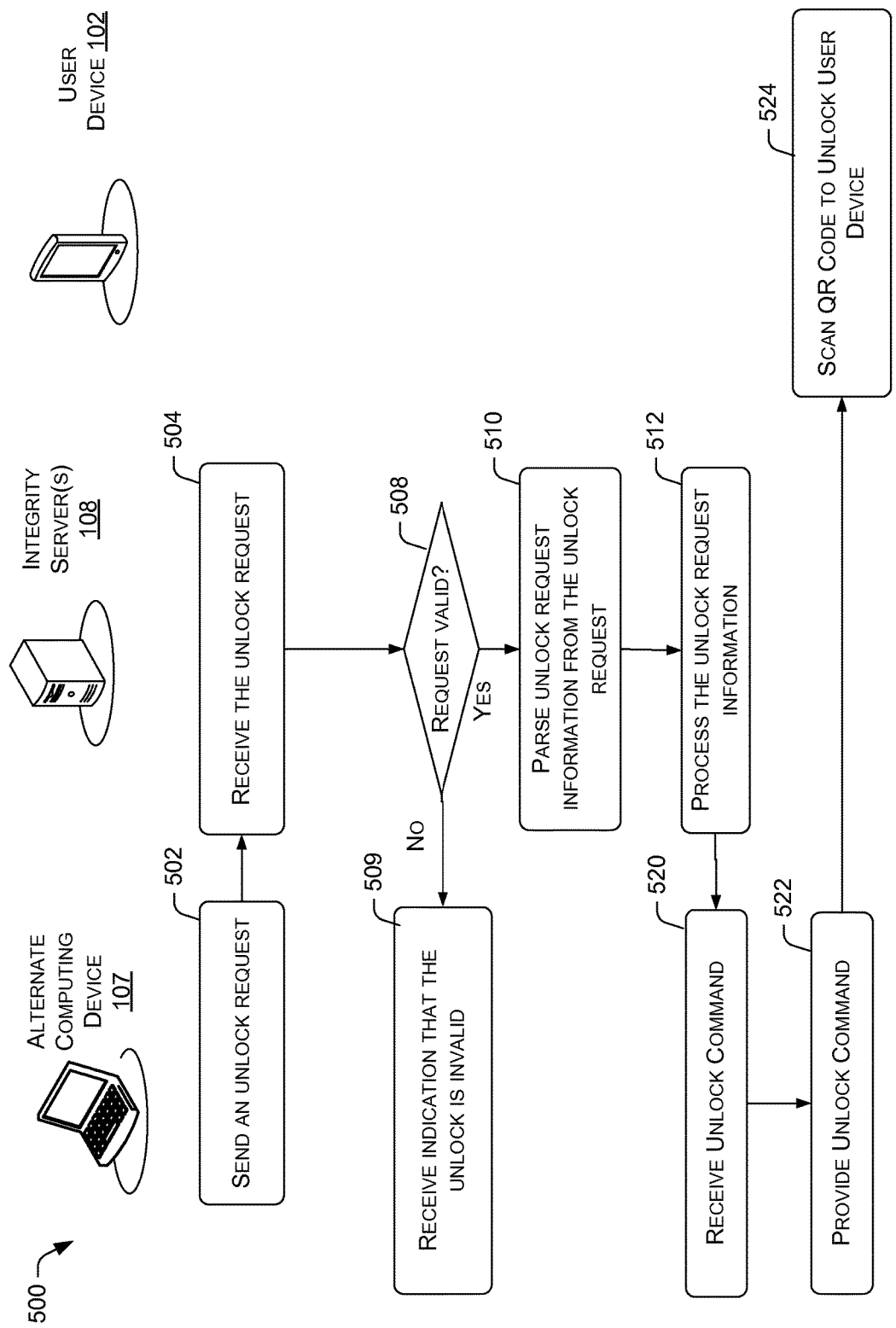
FIG. 5 is a flow diagram of an example process for unlocking a user device by an integrity server, wherein the request to unlock the user device originates from an alternate computing device.

FIG. 5 is a flow diagram of an example process 500 for sending an unlock request from an alternate computing device 107 to a policy engine of the integrity server 108 in order to unlock a user device 102. For example, the user device 102 may not be capable of contacting the integrity server 108 because the user device 102 has at least its SIM unlock app flashed (or deactivated) and can therefore not perform an unlock operation via the SIM unlock app, and is not configured to communicate with the integrity server 108. The process 500 may be performed by various components of the user device 102 and the integrity server(s) 108. In various embodiments, data that is transmitted between the alternate computing device 107 and the integrity server(s) 108 may be routed through the wireless network 106, with or without partial routing through a third-party network.

At block 502, the computing device 107 sends an unlock request to the policy engine 126 of the integrity server to have the user device 102 unlocked. The computing device 107 may contact the integrity sever 108 via various communication technologies, such as CSC, SMS, MMS, USSD, as well as via the internet. In the example of FIG. 5, it will be assumed that the computing device 107 contacts a web page affiliated with the integrity server 108. In various embodiments sending the unlock request at block 502 may include a user of the computing device 107 providing account information via user interface (e.g., display) of the computing device 107.

At block 504, the policy engine 126 of the integrity server 108 may receive the unlock request from the computing device via its web page.

At decision block 508, the policy engine 126 may validate the unlock request 122 by determining whether the user device 102 is authorized to be unlocked based on stored account parameters related to the user device 102. Returning to decision block 508, if the policy engine 126 determines that the unlock request 122 is invalid ("no" at decision block 508), the process 500 may proceed to block 509. At block 509, the policy engine 126 may send an indication that the unlock request is invalid to the computing device 107.

Returning to decision block 508, if the policy engine 126 determines that the unlock request 122 is authorized ("yes" at decision block 508), the process 500 may proceed to block 510.

At block 510, the policy engine 126 may parse unlock request information from the unlock request 122 provided at its web page by the computing device 107. In various embodiments, the unlock request information may include information regarding whether the unlock is to be permanent or temporary, the timeframe of the unlock, one or more geographic locations for the unlock, the unlock request identification information, device identification information, and the like.

At block 512, the unlock request is processed and an unlock command is prepared that is specific to the user device 102. In particular, the unlock command is provided in QR code that can later be scanned by the user device 102.

At block 520, the unlock command is received by the computing device 107. In various embodiments, the integrity protected communication may be received by the computing device 107 via a secure download via the internet, through various known text message technologies, an e-mail address associated with an account of the user device 102 stored at a memory of the integrity server, or USSD response message.

At block 522, the received QR code is provided by the computing device 107 to the user device 102. In various embodiments, the QR code can be displayed on the user interface (e.g., display) of the computing device 107. In another embodiment, the computing device may instruct an associated printer to print out the QR code.

At block 524, the QR code is scanned by the user device 102 to unlock the user device 102 based on the unlock request that originated by the computing device 107.

Figure 6:
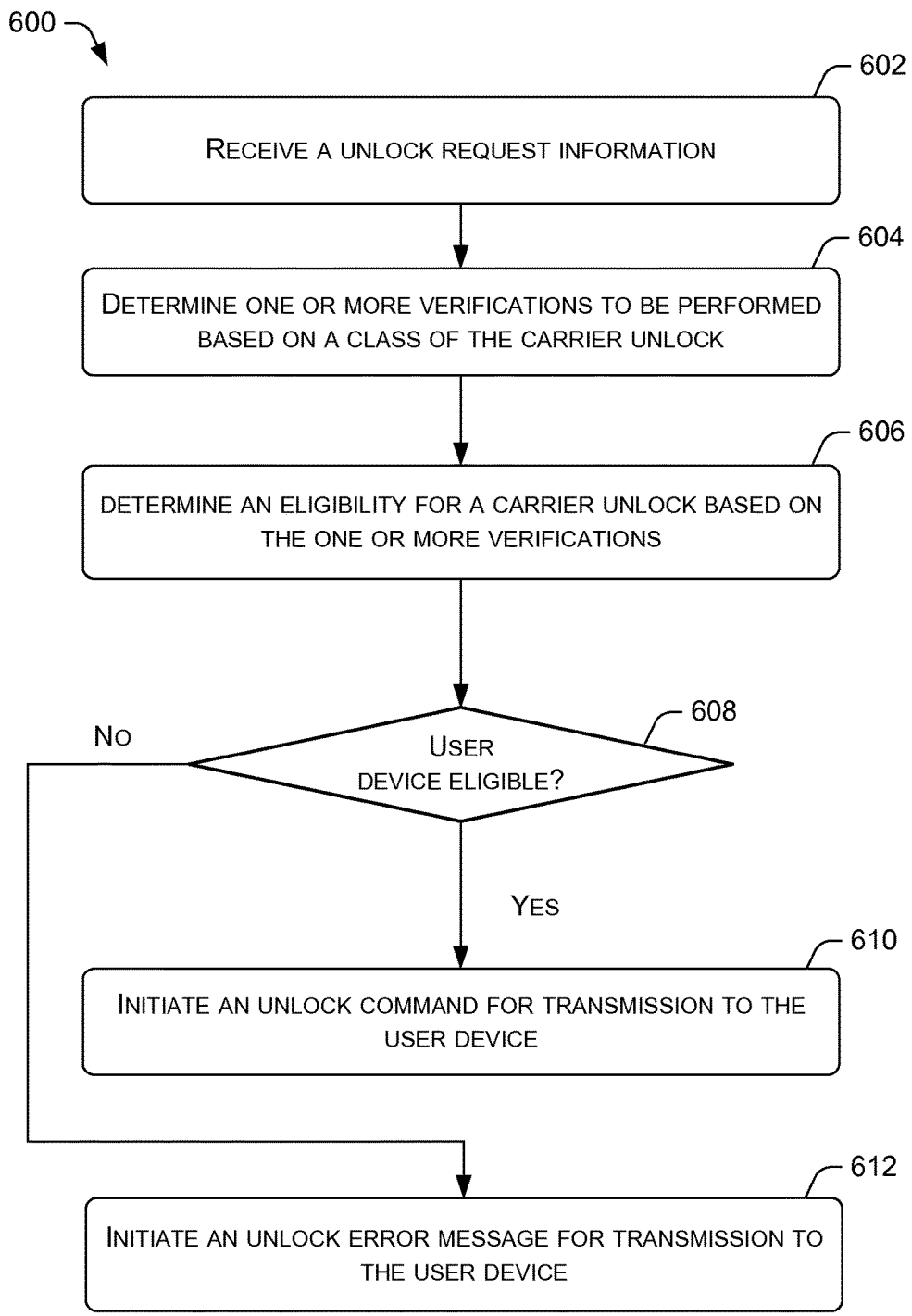
FIG. 6 is a flow diagram of an example process for determining whether a user device is eligible for a carrier unlock.

FIG. 6 is a flow diagram of an example process 600 for determining whether a user device is eligible for a carrier unlock. At block 602, in various embodiments, the policy engine 126 may receive the unlock request information for the user device 102 from an alternate computing device 107 or the user device 102 itself. The unlock request information may indicate that the unlock request 122 is for a scenario of carrier unlock. For example, the scenario of carrier unlock may be dependent on a combination of a permanency of the carrier unlock request, a particular unlock duration specified in the carrier unlock request, a particular geographical area specified in the carrier unlock request, and the like.

At block 604, the policy engine 126 may determine one or more verifications to be performed based on the scenario of the carrier unlock request. The one or more verifications may be performed using one or more databases that include a subscriber account database that holds payment information, a user equipment status database, a subscriber information database, and/or so forth.

At block 606, the policy engine 126 may determine whether the user device 102 is eligible for a carrier unlock based on the one or more verifications. In various embodiments, the verifications may be performed using the one or more profile databases 317. For example, a request for a temporary carrier unlock may result in verification that the user of the user device has no outstanding service bills. In contrast, a request for a permanent carrier unlock may result in verification that the user device is fully paid for and that the user of the user device has no outstanding service bills.

At decision block 608, if the policy engine 126 determines that the user device 102 is eligible for the carrier unlock ("yes" at decision block 608), the process 600 may proceed to block 610. At block 610, the policy engine 126 may initiate an unlock command 128 for transmission to the user device 102. However, if the policy engine 126 determines that the user device 102 is not eligible for the carrier unlock ("no" at decision block 608), the process 600 may proceed to block 612. At block 612, the policy engine 126 may initiate an unlock error message that is transmitted to the user device 102 and/or the computing device 107, as appropriate. In some embodiments, the SIM unlock app 114 may present the unlock error message on a display of the user device 102.

Figure 7:
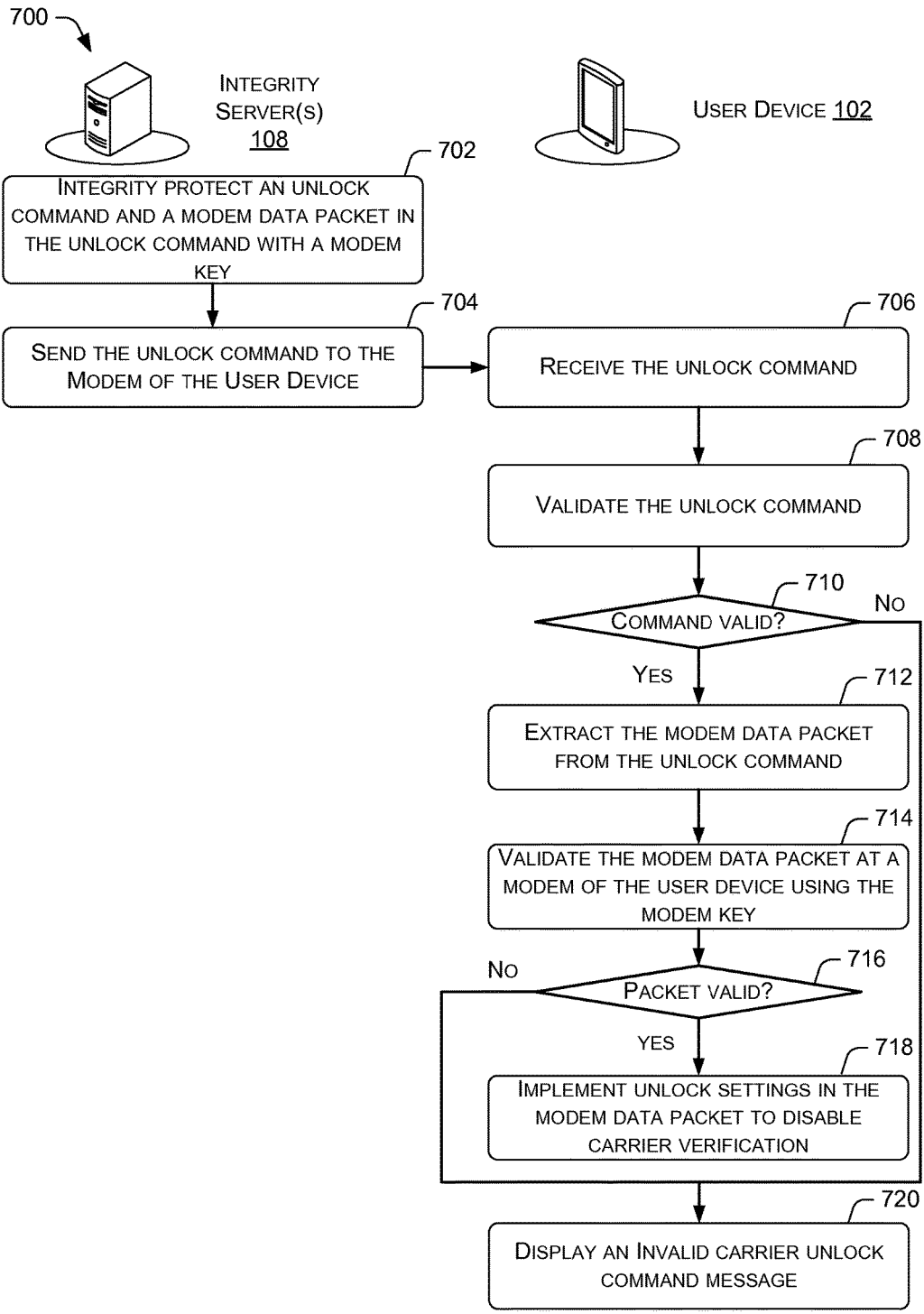
FIG. 7 is a flow diagram of an example process for sending an unlock command from the integrity server(s) to disable a performance of carrier verification by a user device at device startup.

FIG. 7 is a flow diagram of an example process 700 for sending an unlock command from an integrity server to disable a performance of carrier verification by a user device 102 at device startup. The process 700 may be performed by the user device 102 and the integrity server(s) 108. In various embodiments, data that is transmitted between the user device 102 and the integrity server(s) 108 may be routed through the wireless network 106, with or without partial routing through a third-party network.

At block 702, the policy engine 126 on the integrity server(s) 108 may integrity protect the unlock command 128 with a modem key. The modem key may be a duplicate copy of the modem key that is stored in the key database 318. In this regard, it is noted that the database may also store a device key 222 that may be used to integrity protect the unlock command 128 only upon a determination by the integrity server 108 that the user device 102 is not flashed. For example, if the unlock request does not originate from the device unlock application 114, a device key 222 is not used. Instead, a modem key may be used for integrity protection purposes.

The integrity protection of the unlock command 128 may involve the calculation of the message digest 332 for the unlock command 128 using the duplicate copy of the modem key 224. The unlock command 128 may include a modem data packet 328 that is integrity protected using the modem key 224. The modem key may be a duplicate copy of the modem key 224 that is stored in the key database 318. The integrity protection of the modem data packet 328 may involve the calculation of the message digest 330 for the modem data packet 328 using the duplicate copy of the modem key 224.

At block 704, the policy engine 126 may send the unlock command 128 directly to the user device 102, thereby bypassing the device application 114 layer, which may be flashed or deactivated. At block 706, the modem 112 of the user device 102 may receive the unlock command 128. At block 708, the modem 112 on the user device 102 may validate the unlock command using the modem key 224. In various embodiments, the SIM unlock app 114 may perform the validation by calculating a verification message digest for the unlock command 128 using the modem key 224, and comparing the verification message digest to the message digest 332. Accordingly, matching message digests may indicate that the unlock command 128 is valid, while non-matching message digests may indicate that the unlock command 128 is invalid.

At decision block 710, if the modem 112 determines that the unlock command 128 is valid ("yes" at decision block 710), the process 700 may proceed to block 712. At block 712, the modem may extract the modem data packet 328 from the unlock command 128. In various embodiments, the extraction of the modem data packet 328 may include the extraction of the message digest 330 that is appended to the modem data packet 328.

At block 714, the SIM lock engine 116 of the modem 112 may validate the modem data packet 328 using the modem key 224. In various embodiments, the SIM lock engine 116 may perform the validation by calculating a verification message digest for the modem data packet 328 using the modem key 224, and then comparing the verification message digest to the message digest 330. Accordingly, matching message digests may indicate that the modem data packet 328 is valid, while non-matching message digests may indicate that the modem data packet 328 is invalid. The SIM lock engine 116 may also examine other factors, such as a session identifier of the modem data packet 328, timestamp of the modem data packet 328, etc., to determine whether the modem data packet is valid.

At decision block 716, if the SIM lock engine 116 determines that the modem data packet is valid ("yes" at decision block 716), the process 700 may proceed to block 718. At block 718, the SIM lock engine 116 may implement the unlock settings in the modem data packet to disable carrier verification. The unlock settings may disable the performance of carrier verification by the SIM lock engine 116 at boot time of the user device 102. In various embodiments, the unlock settings may include the duration of the temporary carrier unlock, a start date and time for the temporary carrier unlock, and/or an end date and time of the temporary carrier unlock.

Returning to decision block 710, if the SIM lock engine 116 determines that the unlock command 128 is invalid ("no" at decision block 710), the process 700 may proceed to block 720. At block 720, the user device 102 may present an invalid carrier unlock command message on a display of the user device 102. Returning to decision block 720, if the SIM lock engine 116 determines that the modem data packet 328 is invalid ("no" at decision block 720), the process 700 may proceed to block 720. At block 720, the SIM lock engine 116 may cause the user device 102 to present an invalid carrier unlock command message on a display of the user device 102. In some embodiments, the SIM lock engine 116 may send an invalidity indicator to the policy engine 126. The invalidity indicator may cause the policy engine 126 to resend an unlock command to the user device 102.

Figure 8:
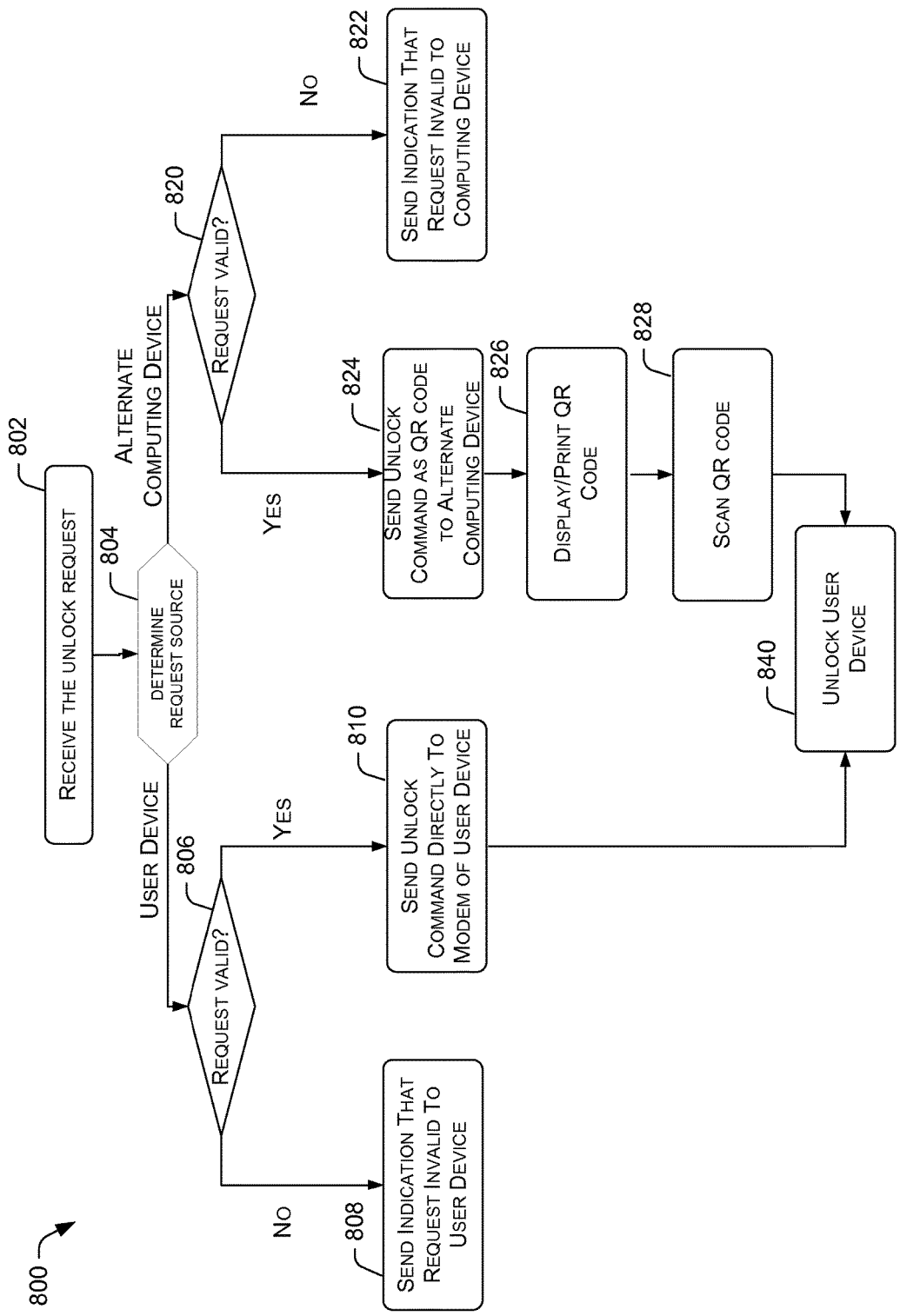
FIG. 8 is a flow diagram of an example process for tailoring the type of unlock command based on the source of the request.

FIG. 8 is a flow diagram of an example process for tailoring the type of unlock command based on the source of the request. At block 802, a request is received by the integrity server 108 to unlock user device 102. At decision block 804, a determination is made by the integrity server as to the source of the unlock request. If the policy engine 126 of the integrity server 108 determines that the request originated from the user device, the process continues with decision block 806.

At decision block 806, if the policy engine 126 of the integrity server 108 determines that the unlock request is not valid ("no" at decision block 806), the process 800 proceeds to block 808, where an indication is sent to the user device 102 that the request is invalid. In one embodiment, the indication is sent in USSD code. If the policy engine 126 determines that the unlock request is valid ("yes" at decision block 806), the process continues with block 810.

At block 810, an unlock command is sent directly to the modem 112 of the user device 102. In one embodiment, the unlock command is sent in USSD code. Consequently, at block 840, the user device is unlocked.

Going back to block 804, if the integrity server 108 determines that the unlock request originated from an alternate computing device 107, the process 800 continues with decision block 820.

At decision block 820, if the policy engine 126 of the integrity server determines that the unlock request is not valid ("no" at decision block 820), the process 800 may proceed to block 822, where an indication is sent to the alternate computing device 107 that the request is invalid. If the policy engine 126 determines that the unlock request is valid ("yes" at decision block 820), the process 800 continues with block 824.

At block 824, an unlock command is sent to the alternate computing device 107. In one embodiment, the unlock command is sent in the form of a QR code.

At block 826, in various embodiments, the QR code may be displayed on an interface (e.g., display) of the alternate computing device or printed out on a printer associated with the alternate computing device.

At block 828, the user device scans the QR code (e.g., either from the display of the alternate computing device or the printout). Consequently, at block 840, the user device is unlocked.

The system and methods discussed herein may provide an automated carrier unlock that results in increased convenience for a user of a user device 102, leading to better customer relations. A user device that has at least its device unlock application flashed or disabled can be unlocked in a short time period. In one aspect, the carrier unlock request may also relieve the customer service representative from having to perform individual checks for multiple databases to determine carrier unlock eligibility. In one aspect, the techniques do not rely on the use of a generic unlock code that is shared by an entire line of user devices. As a result, misappropriation of such an unlocked code by a malicious third party to perform unauthorized unlocking of user devices may be reduced or eliminated. Additionally, the use of integrity protected communication to transmit the unlock requests and the unlock commands excludes the spoofing of such requests and commands by malicious third parties.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. An integrity server comprising:
a processor;
a network interface coupled to the processor configured to enable communications via a communication network;
a storage device for content and programming;
a program stored in the storage device, wherein execution of the program by the processor configures the integrity server to perform acts comprising:
receiving a carrier unlock request from a user device having an unlock application that has been deactivated or flashed;
performing one or more verifications to determine whether the user device is eligible for the carrier unlock requested; and
sending an unlock command directly to a modem of the user device upon determining that the user device is eligible for the carrier unlock, wherein the unlock command is operative to disable a comparison of a device carrier code of the user device to a subscriber identity module (SIM) carrier code stored in a SIM card of the user device.

2. The integrity server of claim 1, wherein the unlock request from the user device and the unlock command are via unstructured supplementary service data (USSD) protocol.

3. The integrity server of claim 1, wherein execution of the program further configures the integrity server to perform acts comprising sending an unlock error message to the user device upon determining that the user device is ineligible for the carrier unlock.

4. The integrity server of claim 1, wherein:
the carrier unlock request includes an encrypted modem key of the modem of the user device, which is integrity protected by a trusted key of a trusted environment of the user device; and
execution of the program further configures the integrity server to perform acts comprising decrypting the encrypted modem key into a decrypted modem key in response to a validation of the trusted key as belonging to the user device.

5. The integrity server of claim 4, wherein the validation of the trusted key is performed by a trusted third-party.

6. The integrity server of claim 4, wherein execution of the program further configures the integrity server to perform acts comprising using the decrypted modem key to validate the carrier unlock request that is integrity protected by the trusted key.

7. The integrity server of claim 4, wherein execution of the program further configures the integrity server to perform acts comprising providing integrity protection to the unlock command and a modem data packet in the unlock command via the decrypted modem key prior to the sending of the unlock command directly to the modem of the user device.

8. The integrity server of claim 7, wherein the modem data packet includes information that is operative to permanently disable a comparison of the device carrier code to the SIM carrier code when the unlock scenario includes a permanent carrier unlock of the user device, or temporarily disable the comparison of the device carrier code to the SIM carrier code for a predetermined period of time when the unlock scenario includes a temporary carrier unlock of the user device.

9. The integrity server of claim 1, wherein the unlock command is specific for the user device in that the unlock command is not operative on other devices.

10. The integrity server of claim 1, wherein an unlock scenario is based on factors that include at least one of: (i) whether the carrier unlock is a permanent or a temporary carrier unlock of the user device, (ii) a geographical region specified by the carrier unlock, and (iii) an unlock time duration when the carrier unlock is a temporary carrier unlock.

11. An integrity server comprising:
a processor;
a network interface coupled to the processor configured to enable communications via a communication network;
a storage device for content and programming;
a program stored in the storage device, wherein execution of the program by the processor configures the integrity server to perform acts comprising:
receiving a carrier unlock request from an alternate computing device for a user device having an unlock application that has been deactivated or flashed;
performing one or more verifications to determine whether the user device is eligible for the carrier unlock requested; and
sending an unlock command to the alternate computing device for the user device, upon determining that the user device is eligible for the carrier unlock.

12. The integrity server of claim 11, wherein the unlock command is in the form of a quick response (QR) code.

13. The integrity server of claim 12, wherein the QR unlock command is specific for the user device in that it is not operative to unlock other devices.

14. The integrity server of claim 12, wherein the unlock command is configured to be at least one of (i) displayed on a user interface of the alternate computing device, and (ii) printed by a printer associated with the alternate computing device, such that it can be scanned by the user device.

15. The integrity server of claim 11, wherein the unlock command is operative to disable a comparison of a device carrier code of the user device to a subscriber identity module (SIM) carrier code stored in a SIM card of the user device.

16. The integrity server of claim 11, wherein the unlock request from the alternate computing device is received via a web page of the integrity server.

17. The integrity server of claim 11, further comprising sending an unlock error message to the alternate computing device upon determining that the user device is ineligible for the carrier unlock.

18. The integrity server of claim 11, wherein execution of the program further configures the integrity server to perform acts comprising providing integrity protection to the unlock command and a modem data packet in the unlock command prior to the sending of the unlock command in QR code to the user device via the alternate computing device.

19. The integrity server of claim 18, wherein the modem data packet includes information that is operative to permanently disable a comparison of the device carrier code to the SIM carrier code when an unlock scenario includes a permanent carrier unlock of the user device, or temporarily disable the comparison of the device carrier code to the SIM carrier code for a predetermined period of time when the unlock scenario includes a temporary carrier unlock of the user device.

20. The integrity server of claim 11, wherein the unlock scenario is based on factors that include at least one of: (i) whether the carrier unlock is a permanent carrier unlock of the user device or a temporary carrier unlock of the user device, (ii) a geographical region specified by the carrier unlock, and (iii) an unlock time duration when the carrier unlock is a temporary carrier unlock.

21. An integrity server comprising:
a processor;
a network interface coupled to the processor configured to enable communications via a communication network;
a storage device for content and programming;
a program stored in the storage device, wherein execution of the program by the processor configures the integrity server to perform acts comprising:
receiving a carrier unlock request;
determining a source of the unlock request;
upon determining that the source of the unlock request is a user device:
upon determining that the unlock request is not valid, sending an indication to the user device that the unlock request is not valid; and
upon determining that the unlock request is valid, sending an unlock command directly to a modem of the user device;
upon determining that the source of the unlock request is an alternate computing device:
upon determining that the unlock request is not valid, sending an indication to the alternate computing device that the request is not valid; and
upon determining that the unlock request is valid, sending an unlock command as a QR code to the alternate computing device to be read by the user device on a display of the alternate computing device or a printout therefrom.

* * * * *